Sept. 27, 1966 H. F. HANSCOM 3,275,261
COLLAPSIBLE REEL
Filed March 23, 1964 2 Sheets-Sheet 1

INVENTOR.
HARRIS F. HANSCOM
BY
Barlow + Barlow
ATTORNEYS

Sept. 27, 1966      H. F. HANSCOM      3,275,261

COLLAPSIBLE REEL

Filed March 23, 1964      2 Sheets-Sheet 2

INVENTOR.
HARRIS F. HANSCOM
BY
Barlow & Barlow
ATTORNEYS

United States Patent Office 3,275,261
Patented Sept. 27, 1966

3,275,261
COLLAPSIBLE REEL
Harris F. Hanscom, Barrington, R.I., assignor to H. F. Hanscom & Company, Inc., a corporation of Rhode Island
Filed Mar. 23, 1964, Ser. No. 353,930
10 Claims. (Cl. 242—110.2)

This invention relates to a reel such as may be used for winding a hose, rope or the like thereon.

One of the objects of this invention is to provide a reel having a body upon which the material to be reeled is wound which is adjustable as to diametrical size for the accommodation of various materials which may be wound thereon.

Another object of this invention is to provide a reel which is not only adjustable as to size, which may be maintained uniform and fixed throughout the operation of the reel, but one which will also have in any of its various adjustable positions a means for collapsing the surface upon which the material is wound so that the material may be easily removed therefrom after it is coiled.

More specifically an object of the invention is to provide a reel which will collapse independently of size adjustment but both of which cooperate to provide a collapsible variable size reel.

Another object of this invention is to provide with the collapsing feature a head against which the material to be wound may be guided as wound and which head moves with the surface upon which the material is wound so as to collapse or expand therewith.

Another object of the invention is to provide a head movable with the surface upon which the material is wound and yet one which may be adjusted axially of the reel.

Another object of the invention is to provide a reel which may be easily collapsed by movement of a long lever making the operation of simple form.

Another object of the invention is to provide for a simultaneous size adjustment of all of the various parts which radially move so that the adjustment of size may be simplified.

With these and other objects in view, the invention consists of certain novel features of construction as will be more fully described and particularly pointed out in the appended claims.

With reference to the drawings, 10 designates a shaft which is a part of the reel body and which extends from the reel to be rotatably mounted in a bearing 11 supported from some part 12 and rotated by a sprocket 13 and chain 14 from a power source.

Figure 2:
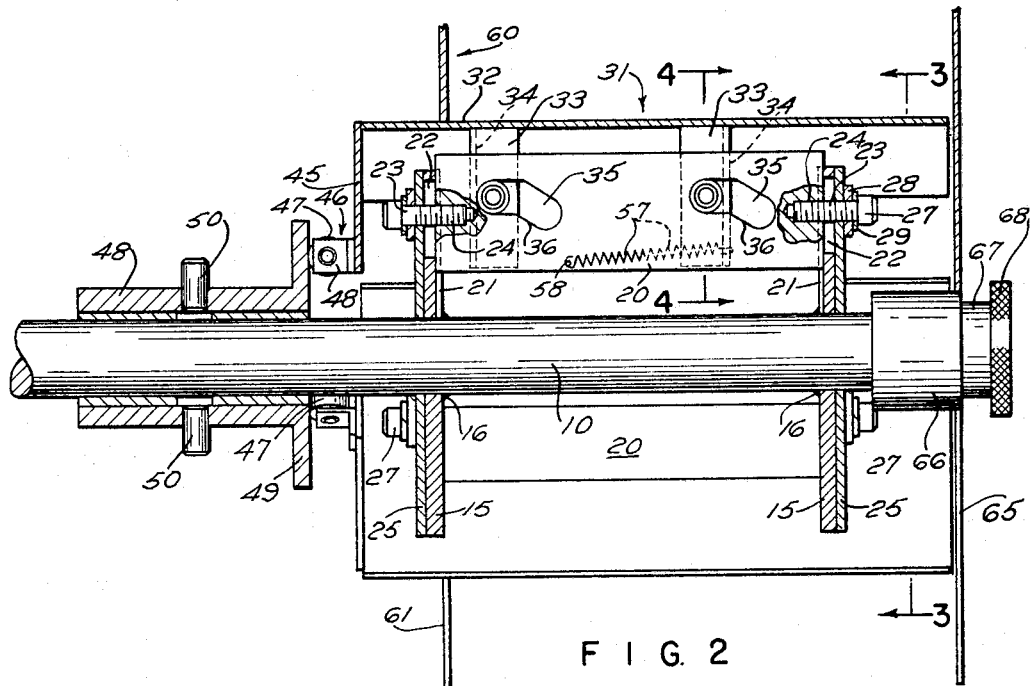
FIG. 2 is a sectional view on substantially line 2—2 of FIG 3.

Referring now more particularly to FIG. 2, the reel body also comprises axially spaced radially extending members 15 which may be of any shape but are here shown as discs and which are welded as at 16 to the shaft 10. The body of the reel also includes a plurality of bars 20, here shown as three, which are slidably mounted in radial grooves 21 in the inner surface of each of the radially extending members 15. A slot 22 of a width less than the width of the guide groove extends through the radial member 15 and a screw 23 extends through this slot and threadingly engages the bar in the threaded bore 24 so as to mount the bar between the spaced radial members 15.

Figure 3:
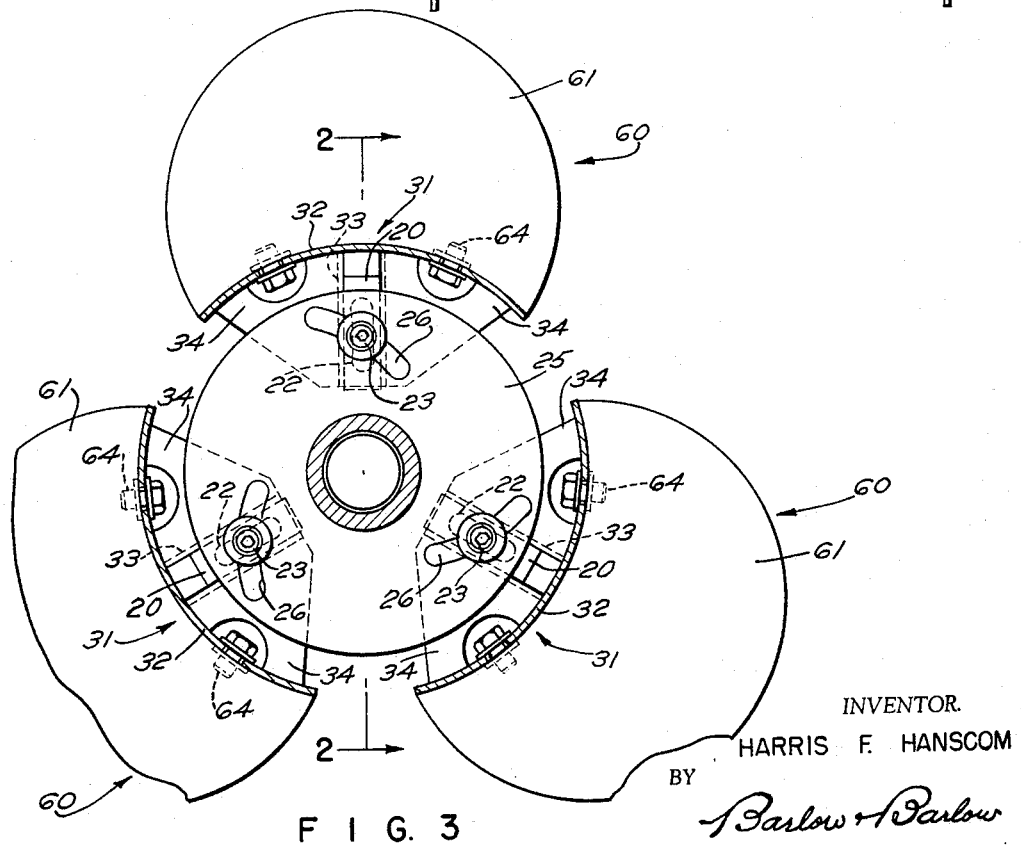
FIG. 3 is a section substantially on line 3—3 of FIG. 2.

Some means for adjusting these bars radially in these grooves to change the size of the body is provided, and one means by which this may be accomplished is by means of the cam disc 25 (see FIG. 3) having cam slots 26 located therein so as to register with the screw 23 and receive the screw 23 in these cam slots. These slots as seen in FIG. 3 are at an angle so that the edges of the slot provide a camming means for movement of the bars 20 inwardly or outwardly depending upon the direction of rotation of the disc member 25 in which these cam slots are located. Thus the body comprising the shaft, the radial members 15 and the bars 20 may be varied as to size by rotation of the cam discs 25 relative to the radial members 15 as occasion may require. Each end of the screws 23 has a head 27 beneath which there is a ring washer 28 and lock washer 29, and after adjustment of the body size is obtained, the screws may be turned in securely to bind the bar 20 between the radial members 15 to hold them in position.

Figure 4:
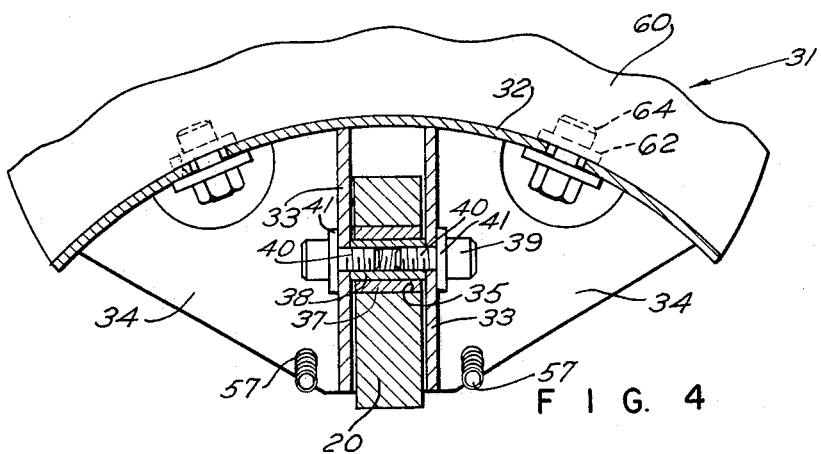
FIG. 4 is a fragmental sectional detail on substantially line 4—4 of FIG. 2.

Each of the bars 20 carries a drum sector 31 which is a piece of sheet stock arcuate in form as may be best seen in FIG. 3 and is designated specifically 32. This sector also has a pair of radially inwardly extending arms 33 which are spaced and straddle the bar 20 and will slide along the opposite surfaces thereof (see FIG. 4). These arms are supported by flanges 34 extending from either side of these arms 33 away from this bar. The bar 20 is provided with a pair of cam slots 35 (see FIG. 2) which extend axially of the reel and also are inclined along one portion 36 thereof to extend inwardly radially of the reel, the cam slots serving to mount the drum sectors by means of the arms 33 for axial movement relative to the bar. Extending through each of these slots 35 (see also FIG 4) is a bushing 37 which slides in the slot and receives the spacer 38 having a threaded bore therein from either end and abutting both of the arms 33. Screws 40 pass through the arms and enter the spacer. The spacer prevents squeezing of the arms on the bar 20. Each of these screws has a head 39 and beneath the heads are washers 41.

Figure 1:
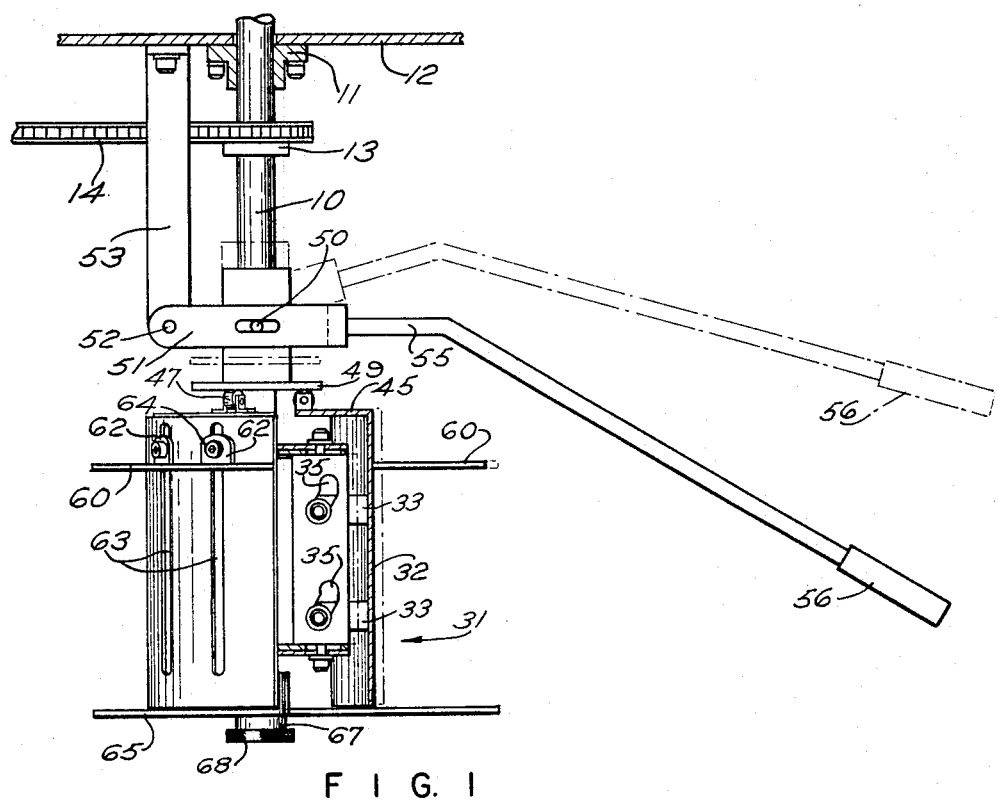
FIG. 1 is a plan view partly in section of the reel and its mounting.

At the end or adjacent the inner end of each of the drum sectors 32, there is a web 45 extending inwardly, and on each of these webs there is an abutment 46 which in this case consists of a roller 47 protruding out beyond this mounting 48 and serving as an anti-friction point of engagement for moving the drum sector 31 axially and at the same time collapsing the sector inwardly by reason of the cam slot 35. This axial movement of the drum sectors is accomplished by means of a collar 48 having a flange 49 to engage the abutments or rollers 47 for movement of the drum sectors. Movement of this collar may be accomplished by means of trunnions 50 which extend outwardly from the collar and are engaged by a yoke 51 (see FIG. 1) pivotally mounted as at 52 upon a bracket 53. This yoke has a lever 55 which extends therefrom and a handle 56 by which it may be easily operated about this pivot 52 so as to move the flange 49 of the collar and sliding the drum sectors axially so as to collapse them when desired. Springs 57 anchored as at 58 and engaging the flanges 34 serve to move the drum sectors as shown in FIG. 2 to expand them when the lever is released.

An inner head is provided for the reel comprising a plurality of sections 60, one for each of the drum sectors. Each section comprises a radially extending portion 61 and a pair of ears 62 (see FIG. 1). The ears are mounted along the arcuate surface of the drum sectors in slots 62 by means of bolts 64 passing therethrough and secured by nuts on the inner surface of the drum sectors. By reason of this arrangement the inner head sectors 60 may be each moved along the drum sectors to a desired position.

In order to provide a removable head for the outer end of the reel, a head 65 may be provided with a clutch type mounting 66 which may be fitted over the end of the shaft 10 and lie in close adjacency to the end of the drum sectors 31. A spring clutch 67 having a knurled handle 68 serves to provide an easy release for this head when it is desired to remove the head and the material which is reeled onto the drum sectors.

I claim:

1. A reel having a body, said body comprising axially spaced radially extending members, means for mounting said members for rotation about a common axis, a plurality of bars between said members symmetrically located with reference to said axis, cooperating means between said bars and members for guiding said bars in radial movement relative to said axis, a first cam means common to all of said bars rotatably mounted on said members for moving said bars radially of said axis for adjusting the radial size of said reel body, a plurality of drum sectors each having a pair of radially extending arms straddling one bar and providing a guide for relative longitudinal movement and a second cam means for radially moving a drum sector relative to said bar upon longitudinal movement thereof relative to said bar.

2. A reel as in claim 1 wherein a web in a plane at right angles to said axis is fixed to each drum sector and extending radially inwardly and axially movable means engageable with each web to force the sector axially to collapse the sectors.

3. A reel as in claim 2 with resilient means to move the sectors in the opposite directions to expand the drum sectors.

4. A reel as in claim 1 wherein said first cam means comprises a disc with a plurality of cam slots therein, one for each bar.

5. A reel as in claim 1 wherein said second cam means comprises cam slots in one of said parts and pins on the other part and located in said slot.

6. A reel having a body, said body comprising axially spaced radially extending members, means for mounting said members for rotation about a common axis, a plurality of bars symmetrically located with respect to said axis between said members, means movably mounted with respect to said members for radially adjusting said bars, a drum sector mounted on each of said bars by means affording relative axial and radial movement, each sector carrying an abutment, axially movable means, said axially movable means engaging said abutments to move said sectors axially and cause relative radial movement thereof.

7. A reel having a body, said body comprising axially spaced radially extending members, means for mounting said members for rotation about a common axis, a plurality of bars symmetrically located with respect to said axis between said members, means movably mounted with respect to said members for radially adjusting said bars, a drum sector mounted on each of said bars by means affording relative axial and radial movement so that relative axial movement causes relative radial movement thereof, a plurality of head sections, one section carried by each of a plurality of drum sectors and means to adjustably mount each head section on its drum sector.

8. A reel comprising a body rotatable about a longitudinal axis, a plurality of drum sectors for contacting the material to be reeled, means for mounting said sectors on the body for radial contraction to release the material reeled therein, a head comprising a plurality of sections with one section mounted on each of a plurality of drum sectors to move with said sector to contracted position and means for axially adjusting each head section along a drum sector.

9. A reel comprising a body rotatable about a longitudinal axis, a plurality of drum sectors for contacting the material to be reeled, means for mounting said sectors on the body for radial contraction to release the material reeled therein, a head comprising a plurality of sections with one section mounted on each of a plurality of drum sectors to move with said sector to contracted position and means for axially adjusting each head section along a drum sector comprising a slot in one part and means passing through the other part and slot to clamp the head section in position.

10. A reel as in claim 9 wherein the slot is in said drum sector.

References Cited by the Examiner

UNITED STATES PATENTS

| | | | |
|---|---|---|---|
| 1,136,627 | 4/1915 | Sullivan | 242—72.1 X |
| 1,950,492 | 3/1934 | Holmes | 242—110.1 |
| 2,318,906 | 5/1943 | Troche et al. | 242—110.2 |
| 2,971,721 | 2/1961 | Jones | 242—110.2 |
| 2,983,460 | 5/1961 | Wright | 242—68.3 |
| 3,047,250 | 7/1962 | Saether | 242—77 |

FRANK J. COHEN, *Primary Examiner.*

GEORGE F. MAUTZ, *Examiner.*